United States Patent [19]
Cestaro et al.

[11] 3,930,881
[45] Jan. 6, 1976

[54] IMMOBILIZED BATTERY ELECTROLYTE

[75] Inventors: John P. Cestaro, Trenton; Linda J. Crosby, Freehold, both of N.J.

[73] Assignee: NL Industries, Inc., New York, N.Y.

[22] Filed: July 22, 1974

[21] Appl. No.: 490,395

[52] U.S. Cl. ................................. 136/26; 136/157
[51] Int. Cl.² ........................................ H01M 47/00
[58] Field of Search .............. 136/157, 158, 26–27, 136/6 L; 252/316, 317

[56] References Cited
UNITED STATES PATENTS

| | | | |
|---|---|---|---|
| 396,367 | 1/1889 | Roberts | 136/158 |
| 1,417,007 | 5/1922 | Williams | 136/158 |
| 3,172,782 | 3/1965 | Jache | 136/26 X |
| 3,586,539 | 6/1971 | Lauck | 136/26 |

*Primary Examiner*—Anthony Skapars

[57] ABSTRACT

A lead acid storage battery is produced wherein the electrolyte is an immobilized paste. The immobilized electrolyte paste comprises 1.5 to 4 parts sulfuric acid having a specific gravity from 1.050 to 1.350 and 1 part organic microparticles being inert to sulfuric acid and having a particle diameter of 0.1 to 3 $\mu$.

9 Claims, No Drawings

IMMOBILIZED BATTERY ELECTROLYTE

BACKGROUND OF THE INVENTION

This invention relates to lead acid storage batteries and more particularly to lead acid storage batteries wherein the electrolyte is an immobilized electrolyte paste.

The lead acid storage battery, which converts chemical energy into electrical energy, generally consists of positive and negative plates, separators between the plates, a dilute sulfuric acid as the electrolyte, and a battery case wherein the preceding elements are positioned in the case.

The reversible reaction is basically as follows:

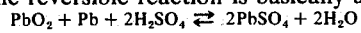
$$PbO_2 + Pb + 2H_2SO_4 \rightleftarrows 2PbSO_4 + 2H_2O$$

During charging the equation proceeds from right to left and during discharging from left to right.

Several drawbacks with these batteries are from the standpoint of safety and maintenance. Care must be exercised in handling these batteries to prevent spillage of the fluid sulfuic acid electrolyte since this electrolyte is a hazardous material. Also the batteries require continuous periodic maintenance of adding makeup water to the electrolyte due to the evaporation of water from the sulfuric acid electrolyte.

Various additives are known which will immobilize the electrolyte and thus decrease the hazards of spillage and decrease the amount of maintenance by inhibiting water evaporation from the sulfuric acid electrolyte. These methods have, however, accompanying disadvantages.

One such additive is very fine, sub-micron, silica particles with a diameter of the order of 0.02 $\mu$. These sub-micron silica particles immobilize the electrolyte by forming a gel. A disadvantage with this additive is in the handling of the silica before it is admixed with the electrolyte. Because of the extreme fineness of this material it readily becomes airborne and measures must be taken to confine it. Furthermore, care must be exercised to prevent inhalation of this material due to health hazards.

Other additives which have been used to immobilize sulfuric acid electrolytes are organic polymers containing hydrophilic functional groups such as polyacrylamide, polyvinyl alcohol, and copolymers of maleic anhydride and methyl vinyl ether.

These organic polymers immobilize the electrolyte by forming gels since they contain hydrophilic functional groups capable of partial solubility in the electrolyte. The disadvantage, however, of these partially soluble gel forming polymers is that because of their hydrophilic functionality, they also break down in the electrolyte. Their life as an immobilizer is, therefore short and upon breaking down they also pollute the electrolyte.

Prior to this invention, organic polymers which are stable in the sulfuric acid electrolyte, since they do not contain hydrophilic functional groups, have, previously, not been considered useful for this purpose because they correspondingly do not gel to immobilize the electrolyte.

Sodium silicate, water glass, has also long been known to gel and thereby immobilize sulfuric acid electrolytes. Only a high purity, chlorine free sodium silicate, however, may be used since the chlorine damages the effectiveness of the cell. Furthemore, sodium silicate which is sufficiently chlorine free is expensive and difficult to obtain.

Brief Summary of the Invention

It is an object of this invention to provide a lead acid storage battery to eliminate the hazards associated with electrolyte spills by forming a paste to immobilize the electrolyte.

It is another object of this invention to provide a lead acid storage battery wherein the immobilized electrolyte does not substantially affect electrical efficiency of the cell.

It is another object of this invention to provide a material to immobilize the electrolyte which is easy and safe to handle before admixing with the electrolyte.

Still another object of this invention is to provide an organic material which will immobilize the electrolyte but is not partially soluble in the electrolyte and, therefore, will not break down in the sulfuric acid electrolyte.

Still another object of this invention is to provide an organic material which will inhibit the evaporational loss of water in the sulfuric acid electrolyte and, thereby, decrease the amount of maintenance by requiring less makeup water.

And, still another object of this invention is to provide a material to immobilize the battery electrolyte wherein this material is readily available in a pure state so that it will not contaminate the cell. Other objectives will be apparent from the following description of this invention.

This invention provides for a lead acid storage battery which comprises a battery housing, positive and negative lead base electrodes, and an immobilized electrolyte paste. The immobilized electrolyte paste comprises 1.5 to 4 parts sulfuric acid having a specific gravity of from 1.050 to 1.350 and 1 part organic microparticles being inert to sulfuric acid and having a particle diameter from 0.1 to 3 $\mu$.

Organic microparticles which are inert to sulfuric acid include polystyrene, polymethyl methacrylate, polypropylene, and polyethylene. The former two organic microparticles are more readily available and, therefore, are preferred.

Other organic polymers such as urea formaldehyde and the like which also may be produced as microparticles, cannot be employed, since they break down in the presence of sulfuric acid.

DETAILED DESCRIPTION OF INVENTION

There are numerous known ways of constructing lead acid storage batteries. A common method for making such a battery is to use at least one lead base alloy grid as the positive electrode and at least one lead base alloy grid as the negative electrode. Generally, a battery paste is imbedded into the electrode grid structure. This paste may consist of lead monoxide and sulfuric acid. The electrodes are positioned in a battery casing constructed from hard rubber, plastic, or glass. The positioning of the pasted electrodes is such that the positive and negative grids alternate, but do not contact. Spacers or separators are generally added to aid in preventing the contact of positive and negative grids. The negative grids, however, are electrically connected to one another and to a negative electrode terminal. The positive grids are also connected to each other and to a positive electrode terminal. A battery casing cover can also be provided with means for allowing the electrode terminals to protrude through the casing cover and thereby be exposed for electrical connection of the battery.

The assembled battery is now ready for forming and conditioning. Forming acid, sulfuric acid with a specific gravity of 1.050 to 1.350 and preferably with a specific gravity of about 1.070, is added to the battery and a potential is applied to the terminals until the battery is charged. The forming acid is then removed and a conditioning acid, sulfuric acid with a specific gravity of 1.050 to 1.350 and preferably with a specific gravity of about 1.280, is added to the battery and the battery is again charged.

After charging the conditioning acid is removed and the battery is ready for the permanent immobile paste electrolyte of the instant invention. While batteries are generally formed and conditioned in free acid (i.e., acid that has not been immobilized) it has been found that batteries can also be formed and conditioned using the immobilized electrolyte paste of the instant invention. During forming and conditioning a great amount of hydrogen gas is evolved which causes immobilized electrolyte gels to separate from the lead based electrodes and thus decreases the efficiency of the lead acid battery. The immobilized electrolyte paste of the instant invention, however, has sufficient fluidity to recontact the lead base electrodes after the hydrogen has has evolved and thereby the efficiency of the lead acid battery is maintained. By conditioning or forming and conditioning the battery with the immobilized electrolyte paste of the instant invention, the process of preparing a lead acid storage battery is simplified since the intermediate steps of removing the forming and conditioning acid after charging are eliminated.

The immobile paste electrolyte is prepared in the following manner. First, organic microparticles which are inert to sulfuric acid are prepared having a diameter of 0.1 to 3 $\mu$. Organic microparticles which are inert to sulfuric acid include polystyrene, polymethyl methacrylate, polypropylene and polyethylene. The former two organic microparticles being more readily available are preferred. These organic microparticles can be either solid or hollow. Preferably, these organic microparticles have a diameter of from 0.2 to 1 $\mu$. Preparation of these organic microparticles are well known in the art. One method for preparing solid organic microparticles is by emulsion polymerization. A well known emulsion polymerization method can be found in the Journal of Paint Technology (40, No. 527, 541-8 (1968). A method for preparing hollow organic microparticles is described in U.S. Pat. No. 3,784,391.

The organic microparticles are then admixed with sulfuric acid having a specific gravity of from 1.050 to 1.350. From 1.5 to 4.0 parts sulfuric acid are used with each part of organic microparticles.

To facilitate the mixing of the organic microparticles with the sulfuric acid an anionic or nonionic surfactant agent may be employed. Numerous anionic and nonionic surfactant agents useful for this purpose are well known in the art. Some of the more readily available of these surfactive agents are dioctyl sodium sulfosuccinate, sodium lauryl sulfate, and alkylaryl polyether alcohol.

The organic microparticles mix with sulfuric acid to form the immobilized electrolyte paste of the instant invention. It has been found, however, that when organic microparticles larger than 3 $\mu$ are used in the paste, they tend to settle out and do not effectively immobilize the electrolyte.

The prepared immobilized electrolyte paste of the instant invention is now added to the lead acid storage battery which has been described previously.

A convenient method of adding the immobilized electrolyte to the lead acid storage battery is to remove the battery cover, apply the immobilized electrolyte paste to the top of the electrode grids, and vibrate the lead acid battery cell. The vibration will cause the immobilized electrolyte to flow between the electrode grids. There should be sufficient vibration to allow the immobilized electrolyte to make good contact with the grids. After the immobilized paste has been added to the lead acid storage battery, a battery cover can be attached to the battery case. The lead acid storage battery is now operational.

The following examples are presented to more fully describe the invention.

EXAMPLE 1

In this example, a 2 volt lead acid battery cell was prepared in which the immobilized electrolyte of the cell contained hollow polystyrene microparticles having an average diameter of 1 $\mu$.

These microparticles were prepared by mixing polystyrene with a solvent and a non-solvent for styrene. Both the solvent and nonsolvent were also immiscible with water. The styrene-solvent-nonsolvent mixture was then emulsified in water using high shear and a surface active agent. Next the solvent was removed from the emulsion by distillation under reduced pressure. Then the water and the non-solvent were removed by drying, thus forming hollow microparticles of polystyrene having an average diameter of 1 $\mu$. This method is more fully described in U.S. Pat. No. 3,784,391.

These hollow polystyrene microparticles were used to immobilize the battery electrolyte of a 2 volt lead acid battery cell prepared in the following manner.

Nine lead monoxide positive plates (1¾ × 1¾ × 0.045 inch) and ten lead monoxide negative plates (1¾ × 1¾ × 0.045 inch) were placed vertically and in alternating order in a polystyrene case (2¼ × 2½ × 2¼ inch).

The positive plates and the negative plates were prevented from contacting one another by imposing between them perforated, corregated, PVC battery separators. The positive plates were electrically connected to one another and to a positive terminal and the negative plates were also connected to one another and a negative terminal. A removable polyethylene cover for the case was provided.

To form and condition the battery cell a sulfuric acid-polystyrene microsphere paste was prepared and used. The paste was prepared by admixing 1.7 parts of sulfuric acid having a specific gravity of 1.260 with 1 part hollow polystyrene microspheres prepared as described above. This mixture formed an immobilized electrolyte paste. The immobilized electrolyte paste was then placed in the battery cell while vibrating the cell to cause the electrolyte paste to completely cover the electrode plates.

The battery cell was formed by supplying 0.455 amps to the battery cell for 48 hours. The battery cell was then conditioned by supplying 0.152 amps for 64 hours.

Next the cycle life of the battery cell was tested. This was done by placing a 2 ohm resister across the battery cell and then allowing the cell to discharge until the voltage of the cell decreased from 2 volts to 1.75 volts. After discharging the battery cell was recharged. The discharging-charging cycle was continually repeated. The ampere-hours of each discharged cell was calculated. When the ampere-hours of the discharge reached 15% of the theoretical capacity of the cell, the cell was considered "dead". The theoretical capacity of the cell was .24 ampere-hours per gram of active material in the cell. In this example the cell had a theoretical capacity of 14.5 ampere-hours and the cell had a cycle life of 64 discharge-charge cycles.

During the entire life of this battery cell the hollow polystyrene microparticles in the immobilized battery electrolyte remained as a paste and did not separate from the electrolyte or degrade. In addition, the immobilized battery electrolyte remained sufficiently immobilized to prevent the spilling of the electrolyte if the battery cell were temporarily placed on its side and thus greatly decreasing the hazard of an accidental spill.

The operational details are recorded in Table I.

EXAMPLE 2

In this example a lead acid battery cell was prepared and tested as in Example 1 with the following exceptions. The battery cell was formed in free sulfuric acid (no microparticles present) having a specific gravity of 1.070. After forming the forming acid was removed and an immobilized electrolyte paste was added for conditioning and cycling. The immobilized electrolyte paste contained 2 parts sulfuric acid having a specific gravity of 1.300 and 1 part hollow polystyrene microparticles as described in Example 1. This battery cell had a discharge-charge cycle life of 54 cycles, and the hollow microparticles did not separate from the sulfuric acid or degrade, and hence, the electrolyte remained immobilized.

The operational details are recorded in Table I.

Example 3

In this example, a lead acid battery cell was prepared and tested as in Example 1 with the exception that the immobilized battery electrolyte contained 3 parts sulfuric acid for each part of hollow polystyrene microparticles rather than 1.7 parts sulfuric acid as in Example 1. In this example the battery cell had a discharge-charge cycle life in excess of 20 cycles, and the hollow microparticles did not separate from the sulfuric acid or degrade, and hence, the electrolyte remained immobilized.

The operational details are recorded in Table I.

Example 4

In this example, a battery cell was prepared and tested as in Example 1 with the following exception. Five lead monoxide positive-plates and six lead monoxide negative plates were used. The battery cell was formed in free sulfuric acid having a specific gravity of 1.070 and by supplying 0.153 amps for 48 hours. The battery cell was then conditioned in free sulfuric acid having a specific gravity of 1.300 and by supplying 0.184 amps for 16 hours.

After conditioning, the conditioning acid was removed and an immobilized electrolyte paste was added for testing. The paste contained 4 parts sulfuric acid having a specific gravity of 1.300 and 1 part hollow polystyrene microparticles as prepared in Example 1.

In cycling the battery cell, the cell was discharged from 2 volts to 1.25 volts and the drain rate was approximately .4 amps. The battery cell had a cycle life of 45 cycles, and the hollow microparticles did not separate from the sulfuric acid or degrade, and hence, the electrolyte remained immobilized.

The operational details are recorded in Table I.

EXAMPLE 5

In this example, a battery cell was prepared and tested as in Example 4 with the following exceptions. The battery cell was tested with paste containing 2.85 parts sulfuric acid and 1 part solid polystyrene having a diameter of 0.2 $\mu$.

In order to prepare the solid polystyrene particles used in this example an anionic surfactant and a nonionic surfactant were added to water. Then under high shear styrene was added to the water to form an emulsion. Next the styrene was polymerized by adding a redox catalyst and then heating and maintaining the emulsion at reflux temperature. The polystyrene was then separated from the water by spray drying which yielded solid polystyrene microparticles having a diameter of 0.2 $\mu$. This procedure is more fully described in Journal of Paint Technology (40, No. 527, 541-8 (1968).

This battery cell containing the solid polystyrene microparticles had a cycle life of 22 cycles and the solid polystyrene microparticles did not separate from the sulfuric acid or degrade, and hence, the electrolyte remained immobilized.

The operational details are recorded in Table I.

EXAMPLE 6

In this example, a battery cell was prepared and tested as in Example 1 with the following exceptions. Three lead monoxide positive plates (1¼ × 1 15/16 × 0.1 inch) coated with a sulfated lead monoxide paste and two lead monoxide negative plates (1¼ × 15/16 × 0.1 inch) coated with a sulfated lead monoxide paste were used in a polystyrene case (2½ × 2¼ × 1 inch).

Next an immobilized electrolyte paste was added. The immobilized electrolyte contained 1.5 parts sulfuric acid having a specific gravity of 1.300 and 1 part solid polystyrene microparticles having a diameter of 0.6 $\mu$. The solid polystyrene microparticles were prepared substantially as described in Example 5.

This battery cell had a cycle life of 121 cycles; and the microparticles did not separate from the sulfuric acid or degrade, and hence, the electrolyte remained immobilized.

The operational details are recorded in Table I.

EXAMPLE 7

In this example, a battery cell was prepared and tested as in Example 6 with the following exceptions. The immobilized electrolyte contained 3 parts sulfuric acid having a specific gravity of 1.300 and 1 part hollow polystyrene microparticles having an average diameter of 1 $\mu$. The hollow polystyrene microparticles were prepared substantially as described in Example 1.

This battery had a cycle life of 98 cycles, and the microparticles did not separate from the sulfuric acid or degrade, and hence, the electrolyte remained immobilized.

The operational details are recorded in Table I.

EXAMPLE 8

In this example an immobilized electrolyte was prepared using microparticles of polymethyl methacrylate instead of polystyrene. These microparticles were approximately 1 micron in size. They were prepared by the process described in U.S. Pat. No. 3,784,391.

The immobilized electrolyte paste was prepared by admixing 4 parts of sulfuric acid (1.280 sp. grav.) with 1 part of the microparticles. This paste remained in an immobilized state without separation or deterioration upon standing and therefore could be used as successfully as the polystyrene immobilized paste described above.

By the above description and examples, it has been clearly shown that a new lead acid storage battery containing a novel immobilized electrolyte has been produced.

While this invention has been described and illustrated by the examples shown, it is not intended to be strictly limited thereto, and other variations and modifications may be employed within the scope of the claims.

2. An immobilized electrolyte paste according to claim 1 wherein the organic microparticles of the immobilized electrolyte paste have a particle diameter of 0.2 to 1 $\mu$.

3. An immobilized electrolyte paste according to claim 1 wherein the organic microparticles of the immobilized electrolyte paste are solid microparticles.

4. An immobilized electrolyte paste according to claim 1 wherein the organic microparticles of the immobilized electrolyte paste are hollow microparticles.

5. An immobilized electrolyte paste according to claim 1 wherein the organic microparticles are polystyrene.

6. An immobilized electrolyte paste according to claim 1 wherein the organic microparticles are polymethyl methacrylate.

7. A lead acid storage battery comprising:
   a. A battery case;
   b. Positive and negative lead base plates wherein the positive and negative plates are alternately positioned in the battery case in spaced apart relationship;
   c. Means for maintaining the positive and negative plates in spaced apart relationship; and
   d. An immobilized electrolyte paste which comprises a mixture of 1.5 to 4 parts sulfuric acid having a specific gravity from 1.050 to 1.350 and 1 part organic microparticles being inert to sulfuric acid and having a particle diameter of 0.1 to 3 $\mu$.

TABLE I

| EXAMPLE | 1 | 2 | 3 | 4 |
|---|---|---|---|---|
| Microspheres | Hollow Polystyrene | Hollow Polystyrene | Hollow Polystyrene | Hollow Polystrene |
| Microsphere Diameter ($\mu$) | 1 | 1 | 1 | 1 |
| Parts Microspheres in Immobilized Electrolyte Paste | 1 | 1 | 1 | 1 |
| Parts Sulfuric Acid in Immobilized Electrolyte Paste | 1.7 | 2 | 3 | 4 |
| Specific Gravity of Sulfuric Acid in Immobilized Electrolyte Paste | 1.260 | 1.300 | 1.260 | 1.300 |
| Forming Electrolyte | Immobilized Paste | Free Sulfuric Acid | Immobilized Paste | Free Sulfuric Acid |
| Condition Electrolyte | Immobilized Paste | Immobilized Paste | Immobilized Paste | Free Sulfuric Acid |
| Electrode Plate Size (in. × in. × in.) | 1¾×1¾ 1¾×1¾ × .045 | 1¾×1¾ × .045 | 1¾×1¾ × .045 | × .045 |
| Number of Electrode Plates | 9+, 10− | 9+, 10− | 9+, 10− | 5+, 6− |
| Discharging Voltage (Volts) | 2 to 1.75 | 2 to 1.75 | 2 to 1.75 | 2 to 1.25 |
| Approximate Drain Rate (Amps) | 1 | 1 | 1 | .4 |
| Cyclic Life | 64 | 53 | >20 | 45 |

| EXAMPLE | 5 | 6 | 7 |
|---|---|---|---|
| Microspheres | Solid Polystyrene | Solid Polystyrene | Hollow Polystyrene |
| Microsphere Diameter ($\mu$) | .2 | .6 | 1 |
| Parts Microspheres in Immobilized Electrolyte Paste | 1 | 1 | 1 |
| Parts Sulfuric Acid in Immobilized Electrolyte Paste | 2.9 | 1.5 | 3 |
| Specific Gravity of Sulfuric Acid in Immobilized Electrolyte Paste | 1.300 | 1.300 | 1.300 |
| Forming Electrolyte | Free Sulfuric Acid | Free Sulfuric Acid | Free Sulfuric Acid |
| Condition Electrolyte | Free Sulfuric Acid | Free Sulfuric Acid | Free Sulfuric Acid |
| Electrode Plate Size (in. × in. × in.) | 1¾×1¾ 1¼×1 - 15/16 × .05 | 1¼×1 - 15/16 ×.1 | ×.1 |
| Number of Electrode Plates | 5+, 6− | 3+, 2− | 3+, 2− |
| Discharging Voltage (Volts) | 2 to 1.25 | 2 to 1.75 | 2 to 1.75 |
| Approximate Drain Rate (Amps) | .4 | 1 | 1 |
| Cycle Life | 22 | 121 | 98 |

We claim:

1. An immobilized electrolyte paste adaptable for use in a lead acid storage battery wherein the immobilized electrolyte paste comprises 1.5 to 4.0 parts sulfuric acid having a specific gravity from 1.050 to 1.350 and 1 part organic microparticles being inert to sulfuric acid and having a particle diameter of 0.1 to 3 $\mu$.

8. A lead acid storage battery according to claim 7 wherein the positive and negative lead base plates are coated with a sulfated lead monoxide paste.

9. A lead acid storage battery having as an electrolyte an immobilized electrolyte paste adaptable for use in a lead acid storage battery within the immobilized electrolyte paste comprises 1.5 to 4.0 parts sulfuric acid having a specific gravity from 1.050 to 1.350 and 1 part organic microparticles being inert to sulfuric acid and having a particle diameter of 0.1 to 3 $\mu$.

* * * * *